"(12) United States Patent
Sanderson et al.

(10) Patent No.: US 12,549,814 B2
(45) Date of Patent: Feb. 10, 2026

(54) DYNAMIC SYNCING OF AGGREGATED MEDIA FROM STREAMING SERVICES

(71) Applicant: MyFlickList, Inc., San Francisco, CA (US)

(72) Inventors: David Sanderson, San Francisco, CA (US); Eli Bruce Paul Chamberlin, Pinedale, WY (US); Douwe Joannes Bos, Amsterdam (NL)

(73) Assignee: MyFlickList, Inc., San Francisco, CA (US)

( * ) Notice: Subject to any disclaimer, the term of this patent is extended or adjusted under 35 U.S.C. 154(b) by 0 days.

(21) Appl. No.: 18/093,661

(22) Filed: Jan. 5, 2023

(65) Prior Publication Data

US 2024/0236424 A1    Jul. 11, 2024

(51) Int. Cl.
*H04N 7/173* (2011.01)
*H04N 21/462* (2011.01)
*H04N 21/466* (2011.01)
*H04N 21/472* (2011.01)

(52) U.S. Cl.
CPC ..... *H04N 21/4668* (2013.01); *H04N 21/4622* (2013.01); *H04N 21/4667* (2013.01); *H04N 21/47217* (2013.01)

(58) Field of Classification Search
CPC ........... H04N 21/4668; H04N 21/4622; H04N 21/4667; H04N 21/47217
See application file for complete search history.

(56) References Cited

U.S. PATENT DOCUMENTS

| | | | | |
|---|---|---|---|---|
| 6,005,565 | A * | 12/1999 | Legall | H04N 21/4622 715/969 |
| 9,407,651 | B2 * | 8/2016 | Mathis | H04L 63/1425 |
| 9,407,951 | B2 * | 8/2016 | Oh | H04N 21/4312 |
| 9,690,538 | B1 * | 6/2017 | Doyle, III | H04W 4/023 |
| 9,723,363 | B2 * | 8/2017 | Radloff | H04N 5/782 |
| 12,001,749 | B1 * | 6/2024 | Doyle, III | G06F 3/1454 |
| 2002/0144262 | A1 * | 10/2002 | Plotnick | H04N 21/458 348/E7.071 |
| 2004/0255336 | A1 * | 12/2004 | Logan | H04N 21/4663 725/38 |
| 2015/0135206 | A1 * | 5/2015 | Reisman | H04H 20/93 725/18 |
| 2015/0135214 | A1 * | 5/2015 | Reisman | H04H 60/35 725/37 |

(Continued)

*Primary Examiner* — Annan Q Shang
(74) *Attorney, Agent, or Firm* — Cognition IP, P.C.; Edward Steakley

(57) ABSTRACT

Methods and systems describe providing for dynamic syncing of aggregated media from streaming services. For each of a number of streaming services associated with a user, the system: receives a watch list of the user for the streaming service; based on the watch list, determines a playback bookmark for each of a subset of media provided via the streaming service; matches the playback bookmarks for the subset of media to analogous media within the aggregate streaming platform; assigns the playback bookmarks for the analogous media to a user profile associated with the user, such that a user may initiate playback of analogous media within the streaming service starting from the playback bookmark for that analogous media; and updates a content queue based on the analogous media with assigned playback bookmarks.

20 Claims, 11 Drawing Sheets

"

(56) References Cited

U.S. PATENT DOCUMENTS

| | | | |
|---|---|---|---|
| 2015/0150053 A1* | 5/2015 | Hardin | H04N 21/4823 |
| | | | 725/52 |
| 2015/0249859 A1* | 9/2015 | Hartley | H04L 67/303 |
| | | | 375/240.02 |
| 2015/0264436 A1* | 9/2015 | Radloff | H04N 5/76 |
| | | | 386/292 |
| 2016/0000392 A1* | 1/2016 | Wong Po Foo | A61B 8/0891 |
| 2017/0195746 A1* | 7/2017 | Gupta | H04N 21/812 |
| 2019/0199080 A1* | 6/2019 | Schmalz | H02H 3/26 |
| 2021/0185393 A1* | 6/2021 | Kalaichelvan | H04N 21/44029 |
| 2022/0007080 A1* | 1/2022 | Chamberlin | H04N 21/482 |

* cited by examiner

DYNAMIC SYNCING OF AGGREGATED MEDIA FROM STREAMING SERVICES

FIELD OF THE INVENTION

The present invention relates generally to media content, and more particularly, to systems and methods for providing dynamic syncing of aggregated media from streaming services.

BACKGROUND

Within the media landscape, streaming of media content has become a popular way for media providers and/or distributors to deliver media content to users. Streaming services have transformed the industry and altered the habits of media consumers on a fundamental level. Streaming services providers such as Netflix, Amazon, Hulu, HBO, Disney, and more offer streaming services for audiovisual content in ways that are compelling and convenient for the uses of those services.

While the proliferation of streaming services on the media landscape is an indication of how important they are for consumers and the industry, users of the services frequently complain that there are too many services, all of which are offering a significant amount of exclusive content which cannot be found on other services. Thus, switching between multiple services a user is subscribed to is cumbersome, time-consuming, and decreases the level of convenience which streaming services cite as a major benefit. In addition, different streaming services are compatible with different aggregate streaming platforms. For example, one aggregate streaming platform may have a streaming application for Service A installed or installable on the device, but not a streaming application for Service B. A user subscribed to both Service A and Service B will have to switch to a different aggregate streaming platform to play back any media content from Service B.

In addition, it is often difficult for users to quickly get a sense of which media content is available across the multiple services they are subscribed to. Particularly, users may wish to obtain watch lists, such as, e.g., currently watching lists, wish lists, or queues from streaming services, and have such lists be imported into an aggregate platform. For media users are in the process of watching or are currently watching, users would like to see, across multiple media services, playback bookmarks for the media, including, e.g., playback positions or timestamps for where they stopped watching. Further, users would like a content queue across multiple services to be updated with the most recent information on such playback bookmarks and watch lists, and in some cases, suggested or recommended content to watch once their current queue is exhausted. Users would find it beneficial to have access to such syncing of content from different streaming services in one place.

Thus, there is a need in the field of media content to create new and useful systems and methods providing for dynamic syncing of aggregated media from streaming services. The source of the problem, as discovered by the inventors, is a lack of a unified streaming service aggregation platform which allows a user to have watch lists from multiple streaming services imported into the platform, with playback bookmarks for media they are currently watching and an up-to-date content queue provided for media across the streaming services.

SUMMARY

The invention overcomes the existing problems by providing for dynamic syncing of aggregated media from streaming services. In one embodiment, for each of a number of streaming services associated with a user of an aggregate streaming platform, the system: receives a watch list of the user for the streaming service; based on the watch list, determines a playback bookmark for each of a subset of media provided via the streaming service; matches the playback bookmarks for the subset of media to analogous media within the aggregate streaming platform; assigns the playback bookmarks for the analogous media to a user profile associated with the user, such that a user may initiate playback of analogous media within the streaming service starting from the playback bookmark for that analogous media; and updates a content queue based on the analogous media with assigned playback bookmarks. In some embodiments, initiating playback may correspond to a user curating media. For example, a user may select media to save and/or watch later and place the selected media in a curated media list. Such curation performed by the user may also be detected as initiating playback of the selected media.

In some embodiments, these aspects of the invention are performed in real-time or substantially real-time, such that syncing of media content and playback bookmarks based on user watch lists, and generation or updating of a content queue, are performed in real time during the user onboarding process for the aggregate streaming platform, or during the user interacting with the aggregate streaming platform, such as, e.g., navigating a user interface of the aggregate streaming platform.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
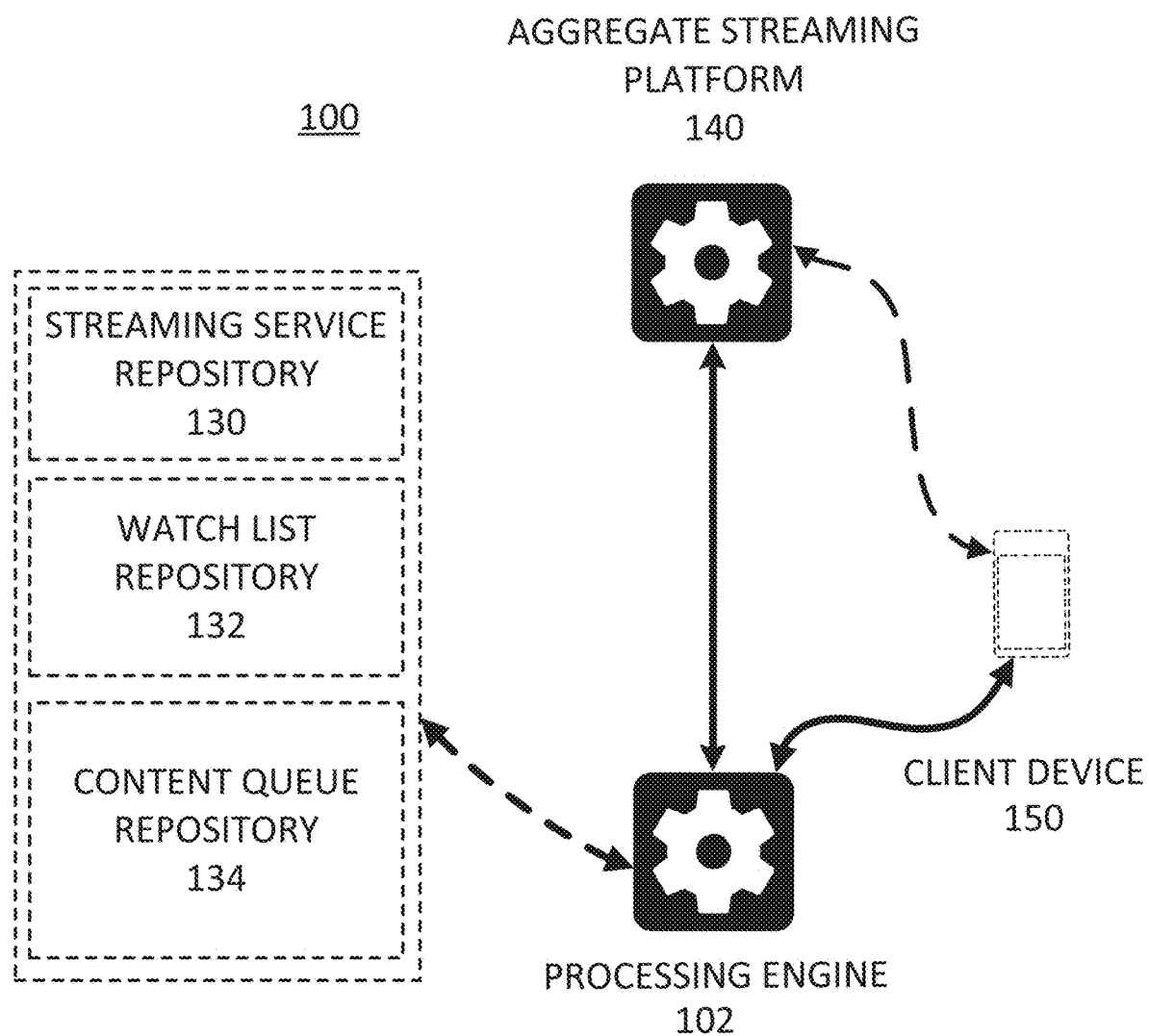
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a client device 150 is connected to a processing engine 102. The processing engine 102 is connected to an aggregate streaming platform 140, and the processing engine 102 can optionally be connected to one or more databases, including, for example, a streaming service repository 130, watch list repository 132, and/or content queue repository 134. One or more of the databases may be combined or split into multiple databases. A client device 150 is connected to the processing engine 102 and the aggregate streaming platform 140. One or more of the processing engine, aggregate streaming platform, and/or client device in this environment may be computers. In some embodiments, the processing engine is hosted on an application installed on the client device 150.

The exemplary environment 100 is illustrated with only one client device, one processing engine, and one aggregate streaming platform, for simplicity, though in practice there may be more or fewer client devices, processing engines, and/or aggregate streaming platforms. In some embodiments, the client device, processing engine, and/or aggregate streaming platform may be part of the same computer or device.

In an embodiment, the processing engine 102 may perform the method 200 (FIG. 2A) or other method herein and, as a result, provide dynamic syncing of aggregated media from streaming services. In some embodiments, this may be accomplished via communication with the client device, aggregate streaming platform, and/or other device(s) over a network, application server, and/or some other network server. In some embodiments, the processing engine 102 is an application hosted on a computer or similar device, or is itself a computer or similar device configured to host an application to perform some of the methods and embodiments herein.

Client device 150 is a device that is configured to display information in a user interface and allow for a user to interact with elements of the user interface. In some embodiments, the client device 150 provides the user interface in the form of an application installed on the device, a web application or service, or any other suitable form. In some embodiments, client device 150 is a computing device capable of hosting and executing one or more applications or other programs capable of sending and/or receiving information. In some embodiments, the client device 150 may be a computer desktop or laptop, mobile phone, tablet, virtual assistant, virtual reality or augmented reality device, wearable, or any other suitable device capable of sending and receiving information. In some embodiments, the processing engine 102 and/or aggregate streaming platform 140 may be hosted in whole or in part as an application executed on the client device 150.

Aggregate streaming platform 140 is a platform that is configured to sync and play back media content from different streaming services a user is connected to, and further configured to allow the user to navigate and browse through pieces of media available for those streaming services in a unified fashion. In some embodiments, the aggregate streaming platform operates via a "smart device" (e.g., a smart TV or a smart box) which is communicatively connected to one or more servers or networks and which hosts one or more applications for syncing, browsing, and/or playing back media content. In some embodiments, the aggregate streaming platform 140 can include downloaded and/or installed application(s) on a broadcast device or client device which facilitate the playback of media content. In some embodiments, the aggregate streaming platform can be made identifiable or visible on a network in which it is connected, allowing other devices (such as client device 150) to locate, identify, and send or receive data from the aggregate streaming platform 140. For example, a client device may automatically identify aggregate streaming platforms which are also connected to the same home network which the client device is connected to.

Additionally or alternatively, aggregate streaming platform 140 may include one or more modules configured to "ping" (i.e., send a signal to make the aggregate streaming platform's presence known to) one or more system server(s). This has the effect of notifying the system (via, e.g., an application programming interface or API) that the aggregate streaming platform is "online", i.e., connected to the system servers. A list of connected aggregate streaming platforms can then be sent to the client device, and upon selection of an aggregate streaming platform from the list, the client device will send a signal back to the system servers, which subsequently forward the data to the aggregate streaming platform. This will be described in further detail below.

Optional database(s) 130 may include one or more of a streaming service repository 130, a watch list repository 132, and/or a content queue repository 134. The optional database(s) function to store and/or maintain, respectively, information such as streaming service providers which are available to the user (such as, e.g., via subscription, trial, free account, or a similar access model), watch lists of media content from those streaming services, and a content queue for a user with media across streaming services. The optional database(s) may also store and/or maintain any other suitable information for the processing engine 102 to perform elements of the methods and systems herein. In some embodiments, the optional database(s) can be queried by one or more components of system 100 (e.g., by the processing engine 102), and specific stored data in the database(s) can be retrieved.

Figure 1B:
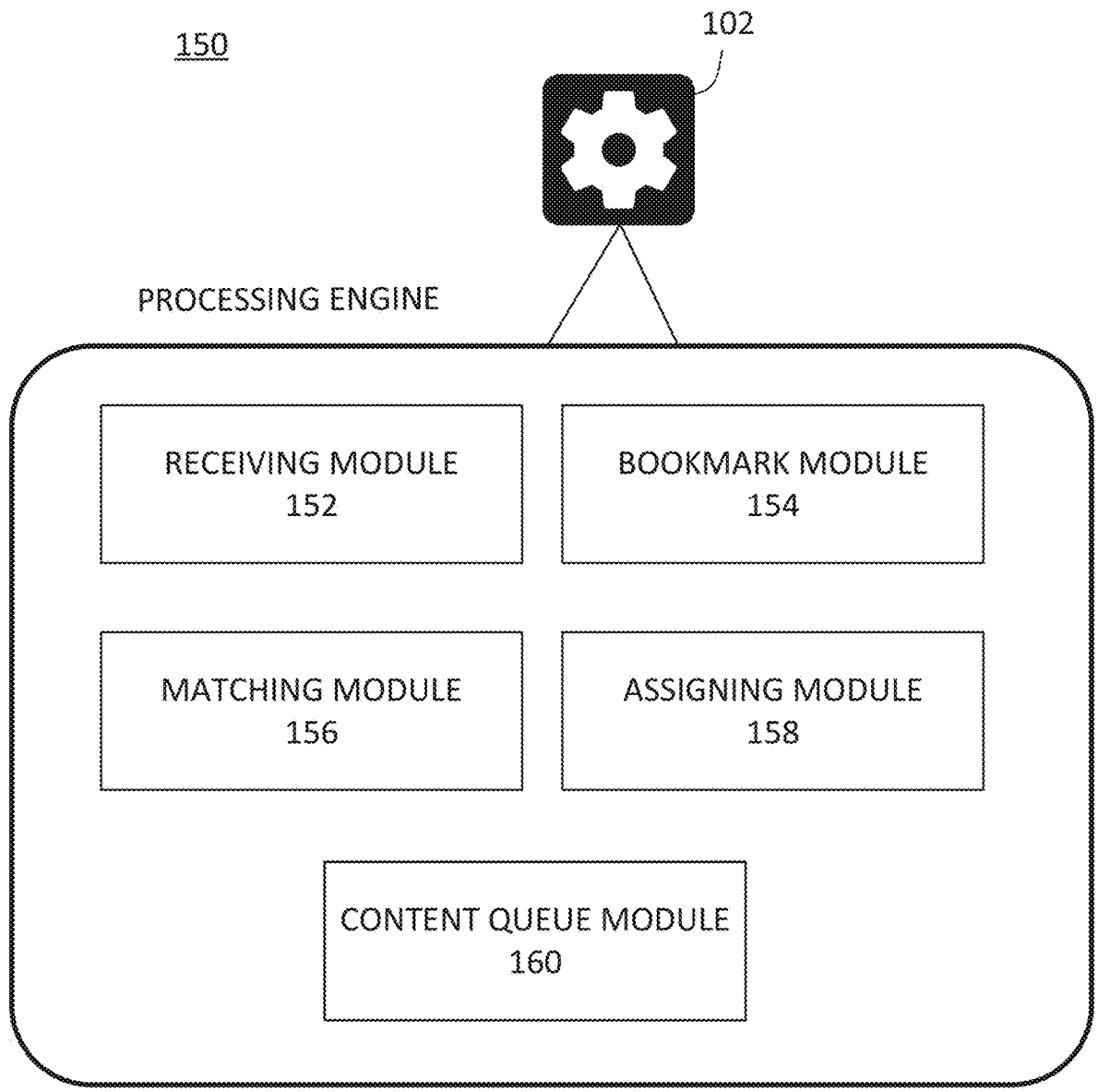
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Receiving module 152 functions to, for each of a number of streaming services associated with a user of an aggregate streaming platform, receive a watch list of the user for the streaming service.

Bookmark module 154 functions to, based on the watch list, determine a playback bookmark for each of a subset of media provided via the streaming service.

Matching module 156 functions to match the playback bookmarks for the subset of media to analogous media within the aggregate streaming platform.

Assigning module 158 functions to assign the playback bookmarks for the analogous media to a user profile associated with the user, such that a user may initiate playback of analogous media within the streaming service starting from the playback bookmark for that analogous media.

Content queue module 160 functions to update a content queue based on the analogous media with assigned playback bookmarks.

The above modules and their functions will be described in further detail in relation to an exemplary method below.

II. Exemplary Method

Figure 2:
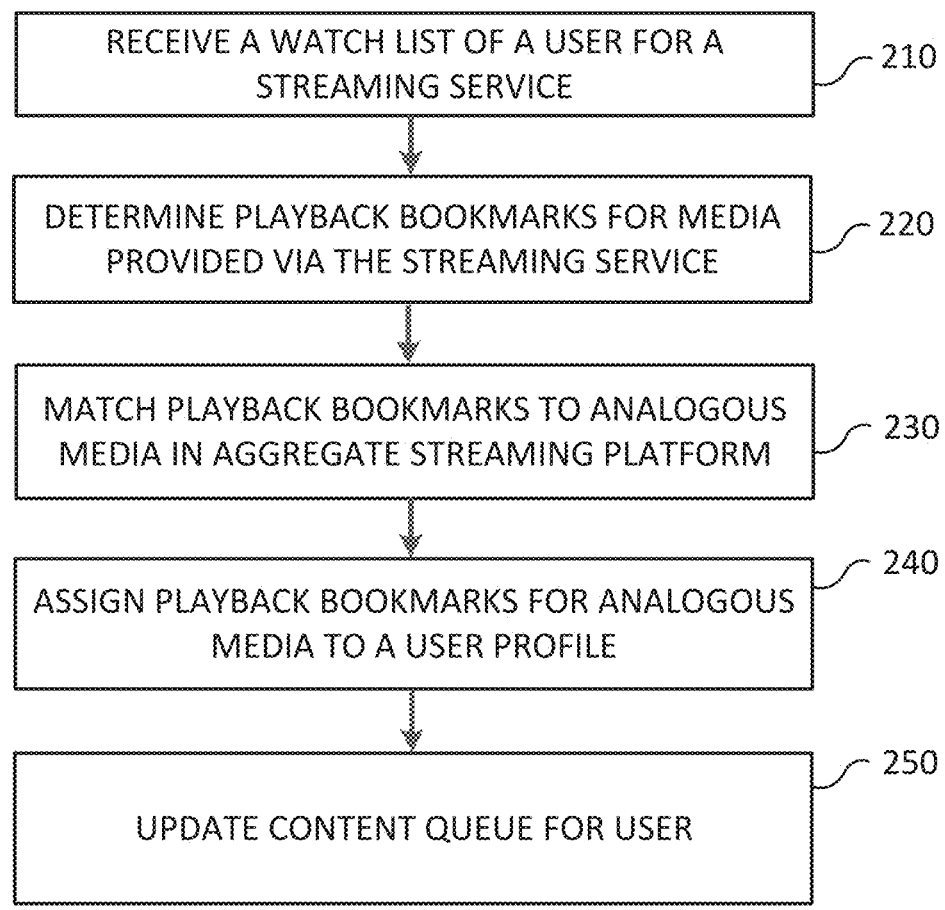
FIG. 2 is a flow chart illustrating an exemplary method that may be performed in some embodiments.

FIG. 2 is a flow chart illustrating an exemplary method that may be performed in some embodiments.

At step 210, the system, for each of a number of streaming services associated with a user of an aggregate streaming platform, receives a watch list of the user for the streaming service. In various embodiments, such a watch list can be "imported" from a streaming service in a variety of ways, as will be described below. It is understood that a user may be represented by a particular user account.

In some embodiments, the system receives information on a number of streaming services or streaming service providers (hereinafter "service providers") which are associated with a user. Service providers may be any providers or distributors of streaming services which provide their users with access to media content and media content services. This may include streaming services which are configured to stream media content to users via user devices such as TVs, mobile devices, computers, or other devices. Examples of service providers may include, e.g., Netflix, Amazon, Hulu, or any other provider of a streaming service. In some embodiments, a user of a service provider is linked to the service provider via a user account, subscription, or other form of connection marking the user as a user of that service. In some embodiments, one user may be associated with multiple service providers. In some embodiments, a service provider may allow one or more other services to integrate or connect with the service through an application programming interface (API) or other form of integration between applications or services. In some embodiments, streaming services allow users to browse through selections of media content.

In some embodiments, streaming services can allow users to be associated with "watch lists" of media content within the streaming service. A watch list may be a list containing one or more of, e.g., content the user is currently watching or has started watching but has not yet finished, content the user has not yet started watching but wishes to watch in the future, content the user has already watched but wishes to watch again. Such content may include, for example, movies or television serials available on the streaming service.

In some embodiments, the system retrieves a watch list consisting of media content and associated content metadata. Media content may be any playable media, such as, e.g., video such as movies, TV shows, or games, music or audio, virtual reality ("VR") or augmented reality ("AR") content, and more. In some embodiments, the system continuously, periodically, or semi-periodically retrieves all available content for each service which the system is set to monitor. In some embodiments, this retrieval may be performed concurrently during one or more other steps of the methods described herein. For example, the system may continuously crawl all available content on each service it monitors to retrieve content data. In various embodiments, this may include every service within the system, only services selected by the user in step 204, or some other subset of services. In some embodiments, the system stores and maintains the content within a media content database.

In some embodiments, the system additionally receives content metadata associated with the content. In various embodiments, the content metadata can be received from, e.g., one or more service providers, production studios, and/or third parties. For example, in some cases, media content may be retrieved which is not yet currently available or offered on any of the services. In some embodiments, content metadata is stored and maintained within a metadata repository or database. In some embodiments, the content metadata includes information on which service is associated with that given piece of content. The information about which service offers the media content can be a metadata field. Other metadata fields can include, e.g., the title of the content, genre(s), description of the content, length or running time of the content, a popularity ranking or aggregated review score, similar media content, and more. When a user selects a certain combination of services or service providers, the media content and content metadata available on these services are retrieved from one or more databases. In some embodiments, the databases are local to the system's servers or are otherwise maintained server-side, such that the system need not remotely call or make requests to any service provider servers as a result of the user selecting service providers. In other embodiments, the system may call or request content from one or more service providers after the user selects service providers.

In some embodiments, the associated content metadata includes unique content identification data, which is used for identification and playback of the media content from one or more media servers or repositories for the media content. In some embodiments, the unique content identification data may be, e.g., a deeply linked address for the respective media content. In some embodiments unique content identification data may be a metadata value for a predefined metadata keyword field. For example, there may be a first metadata value for a "Title" predefined metadata keyword field and a second metadata value for a "Director" predefined metadata keyword field. unique content identification data may also be textual data that accompanies the media content, such as text describing the plot or topic of the media content. In various embodiments, a unique address of a storage and/or playback location of a piece of media content may be needed or requested by an aggregate streaming platform. In some embodiments, this address may be, e.g., a hyperlink or other form of linking to a searchable or indexed piece of content within a media content repository, media server, cloud server, or other location. In other embodiments, rather than a hyperlink or internet address, a unique identification number is provided for locating the media content on a media server of the service provider in order to initiate playback of the media content on the aggregate streaming platform.

In some embodiments, the system receives information about service providers associated with the user automatically by determining which services the user is connected to, such as through a specified email account or other form of connection. In one or more embodiments, the system determines a user's preferred services based on a state (or status) of an instance of application associated with the user whereby the application includes functionality for accessing and browsing a service and selection of media content for playback from the service. In various embodiments, the system monitors user interactions and determines a preferred service of a user based on detecting the user has initiated playback of media content from a particular service. In some embodiments, the system prompts the user to select one or more services from a predefined selection of services, asks the user to type the names of services, or otherwise prompts for a selection. The system then receives a selection from the user accordingly. In some embodiments, the user may search or browse some or all available content without needing to select any services the user may be connected to.

In some embodiments, the system receives a watch list for a given streaming service fetching data from one or more locations. In some embodiments, this can occur as a one-time fetch of data. In such a case, a user may fetch data again by, for example, manually requesting a fetch within the aggregate streaming platform. In some embodiments, the system can be configured to periodically re-fetch data from the location after a specified period of time. In some embodiments, this period of time may be configurable by the user.

In some embodiments, a webpage or series of webpages associated with a streaming service platform may provide access to a watch list for a user who is logged in as a user of the streaming service or is otherwise authorized to access the watch list. For example, within a "watch history" page for a streaming service, a user may be able to navigate to their user profile, where a list and associated data is provided for all media content which the user has viewed, rated, started, and stopped. In some embodiments, the system may be able to fetch that list and/or associated data using, e.g., login information provided by the user such as an email address and/or other data. In some embodiments, the system loads such a watch history page in a background process, then executes one or more algorithms to extract the watch history information from the page. In some embodiments, the system receives authorization or permission from the user to access the relevant page or data.

In some embodiments, the system receives the watch list and/or associated data via the streaming service exposing the data. In some embodiments, the service may expose the data via, e.g., an Application Programming Interface ("API") which the service also makes use of in one or more clients, websites, or applications. The system may be configured to extract the watch list via this exposed data. In some embodiments, an API may be provided on an application installed on the user's client device. The user's client device performs the extracting of the data, rather than a remote server, in order to provide an extraction method that is similar to or indistinguishable from the user navigating to their watch history page themselves.

In some embodiments, the system provides a user interface to the user via a client, web page, or application. Within the user interface, the system provides one or more messages asking if the user would like to sync or import their watch history or watch list from the streaming service to the aggregate streaming platform. The user then explicitly assents to this syncing or importing. In some embodiments, the user may submit their user credentials for the streaming service in question. In some embodiments, the user credentials information never leaves the user's client device in any form. That is, the user's client device performs the extracting of the data, rather than a remote server, in order to provide an extraction method that is similar to or indistinguishable from the user navigating to their watch history page themselves. In some embodiments, a background processing algorithm may transmit one or more calls, instructions, or data requests from a remote server to an application or client on the user's client device. The application or client may then attempt to retrieve the watch history from, e.g., a page, client, or other source, using either information provided by the remote server, or information obtained by the application or client itself.

At step 220, the system, based on the watch list, determines a playback bookmark for each of a subset of media provided via the streaming service. In some embodiments, a playback bookmark may be defined as some form of playback information which is associated with a piece of media on a streaming service. In some embodiments, the playback bookmark signifies a playback position or timestamp for a piece of media which represents where in the media the user stopped playback. In some embodiments, a timestamp represented a position amongst a group of serially ordered pieces of media. For example, there may be 10 pieces of serially ordered media and the user have completed playback of the initial 4 pieces of media. The timestamp may thereby be based on a position between a fourth and fifth pieces of serially ordered media. Playback bookmarks can be provided for a subset of media from the streaming service which the user has initiated playback of, but has not yet completed, i.e., the user has not finished watching the entirety of, or has not yet watched up to at least the end credits for the piece of media. In some embodiments, playback bookmarks can be determined from data included in or otherwise associated with or extracted from the watch list received in step 220 from the streaming service.

At step 230, the system matches the playback bookmarks for the subset of media to analogous media within the aggregate streaming platform. In some embodiments, this matching is performed via one or more algorithmic data matching techniques. In some embodiments, the matching is performed, at least in part, based on a unique identification number ("ID") for each piece of media from the streaming service, which is received from the streaming service and is unique to that piece of media within the streaming service.

In some embodiments, such a unique ID is included as metadata that is received as part of receiving the watch list in step 210 above.

In some embodiments, the matching is performed, additionally or alternatively, based on additional metadata received with the watch list, such as, e.g., the title of the piece of media, the year of release, a number of episodes (for a multi-episode piece of media, such as a television serial), one or more actor names, one or more genres, or any other suitable metadata that has been received. In some embodiments, the matching may be performed, additionally or alternatively, based on data received from the user in the past or knowledge about the user received over time, such as, e.g., the user's preferences in the kinds of media the user is most likely to watch based on past watching behavior. In some embodiments, the matching may be performed using one or more artificial intelligence ("AI") or machine learning ("ML") techniques. In some embodiments, data the user has manually submitted to the aggregate streaming platform may be used for the matching. In some embodiments, data which has been extracted from one or more previous syncing sessions where a watch list was retrieved may be used for the matching.

At step 240, the system assigns the playback bookmarks for the analogous media to a user profile associated with the user, such that a user may initiate playback of analogous media within the streaming service starting from the playback bookmark for that analogous media. In some embodiments, this assigning is performed by associating each received playback bookmark for a piece of media with an analogous piece of media within the aggregate streaming platform which has been matched to that piece of media in the previous step. Thus, for example, if a playback bookmark includes the information that a user has finished watching 3 episodes of a particular television show and is 23 minutes into the 4th episode, then this data is assigned to the user profile for the user in such a way that the user has a number of pieces of media in their "currently watching" watch list that include data on where in the media the user has left off watching, and how many episodes (if applicable) the user has finished watching. This information can then be reflected and displayed within the user interface shown to the user while the user is browsing through the media content on the aggregate streaming platform.

At step 250, the system updates a content queue based on the analogous media with assigned playback bookmarks. In some embodiments, a "content queue" may be defined as a queue of media content associated with the user across social media services, provided in some sort of order. In some embodiments, a content queue may include one or more pieces of media the user is currently watching, or has at least initiated playback of at some point and has not yet finished. In some embodiments, the order of the content queue can include a chronological order of when the media was last viewed, accessed, or engaged with. In some embodiments, a content queue may include one or more pieces of media from the user's wish lists for their streaming services, i.e., media which the user has not yet watched but intends to at a later date, has saved or marked for later viewing, or has watched before and intends to watch again. In some embodiments, the order of the content queue can be, at least in part, manually sorted and rearranged by the user via the UI. It is understood that media in a user's wish list may be considered a recommended media content.

In some embodiments, a content queue may not yet exist for the user. For example, a newly onboarded user who has just registered a user account with the aggregate streaming platform may not yet have a content queue generated for them. In such a case, the updating of the content queue actually involves generating a content queue for the user for the first time. This content queue is generated based on the watch list and one or more playback bookmarks associated with media from the watch list. In some embodiments, an existing content queue is already present for a user and their account. In such a case, the system would update the content queue based on the watch list and one or more playback bookmarks associated with media from the watch list. In some embodiments, the process of updating may involve the system rearranging the order of the content queue to take into consideration, e.g., the most recent pieces of media the user accessed, the most engagement or interest in a piece of media compared to other pieces of media based on information about the user's viewing history, activity, and/or detected behavioral preferences.

In some embodiments, once a content queue has been updated for all streaming services associated with the user, content from different streaming services can appear in the content queue, with all of the watch history from different streaming services being reflected. This information is thus aggregated into a single unified platform where the user can then request and initiate playback of a piece of content, and then begin watching or continue watching that piece of content, regardless of platform. In some embodiments, the user is able to pick up with a piece of media where that user left off, regardless of which particular streaming service they are using. The playback bookmark associated with such a piece of media is retrieved by and used by the system and the aggregate streaming platform, and is assigned to the piece of media as it is recognized by the system on the aggregated streaming platform, without the need for fetching such data from any one specific streaming media. For example, even if a particular television show is available on 3 different streaming services, the system is configured to have a consistent playback bookmark assigned to that piece of media and its episodes across the streaming services, such that a user's watch history across the 3 different streaming services is reflected.

In some embodiments, the content queue includes one or more suggestions or recommendations for content to watch. This may appear in a content queue, for example, when the user has exhausted or nearly exhausted all of their media from their watch lists which were currently being watched, or exhausted or nearly exhausted all of the items in their content queue, including, e.g., media from a wish list to watch in the future. In some embodiments, a user may choose to receive recommendations of media content which are to appear in the user interface, such as at a landing page or dashboard upon first starting the application or logging in. Such recommendations can be provided from the user's content queue. In some embodiments, recommendations within a content queue may be customized for each user. In some embodiments, recommendations can be curated for a content queue on behalf of a user based on various pieces of user data, such as, e.g., the user's history of past media content selections.

In some embodiments, the content queue is displayed on the client device of the user. In some embodiments, the content queue may include one or more UI elements for initiating playback of one or more pieces of media in the content queue. In some embodiments, upon a user selecting one or more UI elements within their content queue, the system initiates playback of the media content on the aggregate streaming platform. In some embodiments, initiating playback of the media content on the aggregate streaming platform includes sending a signal which instructs the aggregate streaming platform to begin playback of the content on the respective streaming service. In other embodiments, initiating playback of the media content on the aggregate streaming platform includes the system streaming the content directly to the aggregate streaming platform. In some embodiments, initiating of playback occurs upon the system receiving an acceptance to the request message from the aggregate streaming platform. In other embodiments, a request message need not be sent in order for initiation of playback on the aggregate streaming platform to begin, and/or an acceptance to a request message need not be received in order for initiation of playback to begin. Any other suitable triggering event, or no event, may be contemplated to occur in order for initiation of playback to begin.

In some embodiments, there is no storage of media content files or processing of media content with respect to playback being performed on the aggregate streaming platform. Instead, a location on a media server is transmitted, representing the location of the selected media content on that media server. The media server handles the processing of the media content based on the media content being stored there or, in some embodiments, within a media content repository in a database (such as a cloud-based repository).

In some embodiments, one or more applications or software components can be installed on the aggregate streaming platform which can serve as "message receiver" component(s). Rather than, e.g., directly opening media content located on the media server, the system instead sends a request directly to the message receiver components installed on the aggregate streaming platform. The message receiver continuously receives the request and then determines, externally to the system, how to begin playback of the media content. Such message receiver components can initiate playback on the aggregate streaming platform via potentially any suitable method in which software components can instruct a device to carry out media playback operations, either in concert with other applications on the device or on their own.

Figure 3A:
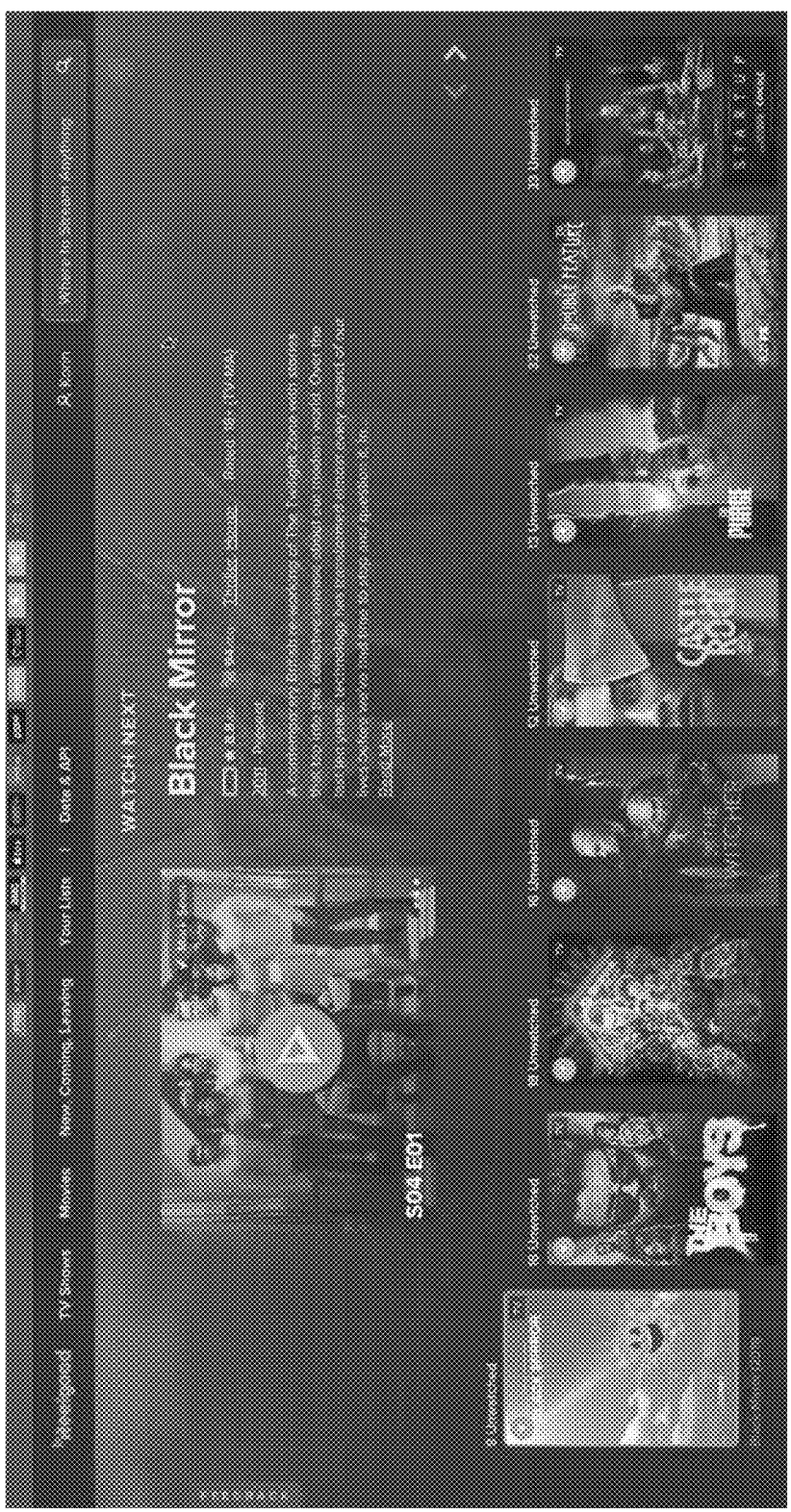
FIG. 3A is a diagram illustrating one example embodiment of a user interface for an aggregate streaming platform, in accordance with some embodiments.

FIG. 3A is a diagram illustrating one example embodiment of a user interface ("UI") for an aggregate streaming platform, in accordance with some embodiments. The user interface shows a user, Korin, who is currently logged in and authenticated within the aggregate streaming platform. The UI provides an ability for a user to search for media content across a variety of streaming services, e.g., "Where to Stream Anything", which may be filtered to only the streaming services the user has access to via, for example, a paid subscription or existing user account. In some embodiments, media content is displayed, including a "watch next" suggestion or recommendation prominently displayed at the top portion of the UI. In some embodiments, this "watch next" selection may be generated for a user and provided as part of the user's content queue when the list of media they are currently watching is exhausted, e.g., they have watched all shows or movies that were in progress. Below the "watch next" selection, a number of additional pieces of content is displayed. In the example, these pieces of content are television serials for which there are one or more episodes the user has not yet watched, listed as, e.g., "9 Unwatched" and "16 Unwatched". In some embodiments, rather than selecting content for display related only to particular service providers, the user sees all of the disparate media content from different service providers within one single, unified format. In some embodiments, the images and other metadata are formatted to be unified within the application and user interface. In some embodiments, other suggestions or trending media content may be provided to the user, such as, e.g., "Trending TV Shows" or "What Others In Your City Are Watching".

Figure 3B:
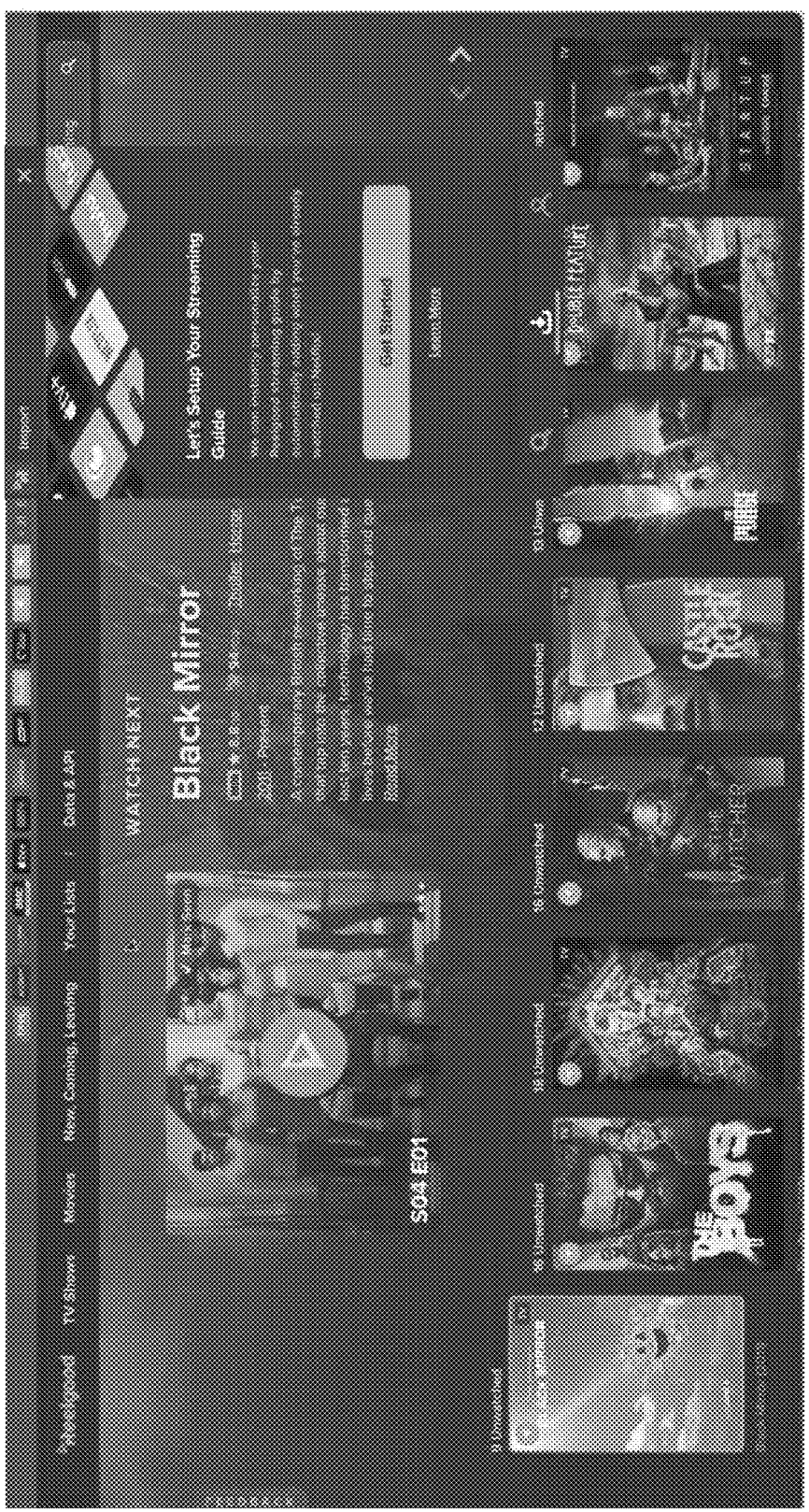
FIG. 3B is a diagram illustrating one example embodiment of a user interface for syncing media from streaming services within an aggregate streaming platform, in accordance with some embodiments.

FIG. 3B is a diagram illustrating one example embodiment of a user interface for syncing media from streaming services within an aggregate streaming platform, in accordance with some embodiments.

In the example, an "import" UI element is displayed, titled "Let's Setup Your Streaming Guide". The title may instead be, for example, "Personalize Your Streaming Guide" or "Sync To Continue Watching Your Services". The user is invited to allow the system to automatically add what the user has already watched on a particular streaming service platform. If the user opts to allow the system to do this, then the system would proceed to perform steps related to receiving a watch list from that streaming service and, in some embodiments, receive metadata associated with content from that watch list, playback bookmarks for pieces of content that the user is currently watching, and more.

Figure 4:
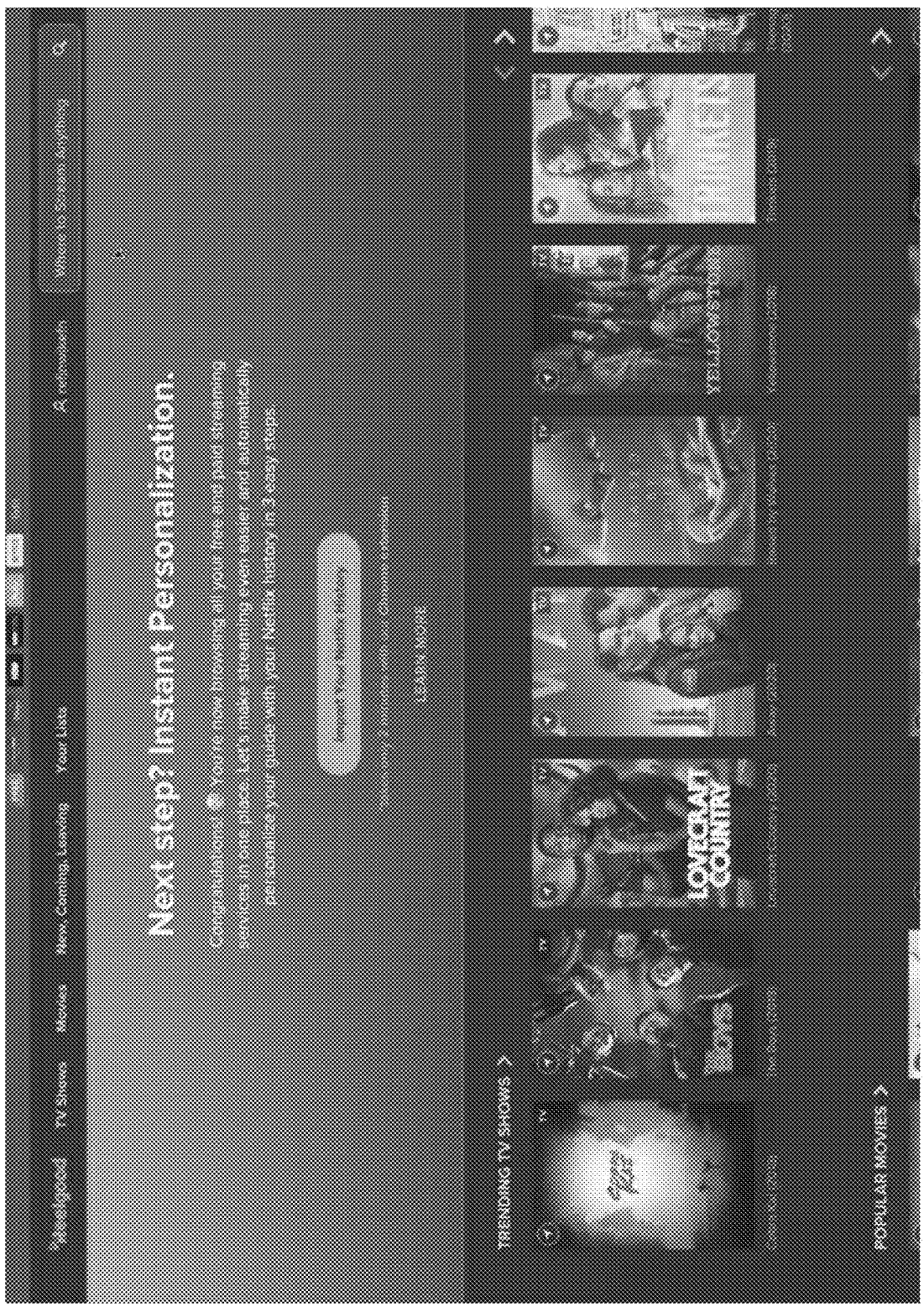
FIG. 4 is a diagram illustrating one example embodiment of a user interface for configuring importing of watch lists from streaming services to an aggregate streaming platform, in accordance with some embodiments.

FIG. 4 is a diagram illustrating one example embodiment of a user interface for configuring importing of watch lists from streaming services to an aggregate streaming platform, in accordance with some embodiments.

Within the user interface, a user is undergoing an onboarding process for new users to the aggregate streaming platform. The user has registered their account information and has proceeded to integrate and/or provide their user information for one or more streaming services they have existing user accounts for. The user is then providing with a message ("Next step? Instant Personalization") encouraging the user to allow the system to import their watch history from one of those streaming services. The message includes a note that this may be accomplished via a browser extension for the browser the user is currently using on their device.

Figure 5A:
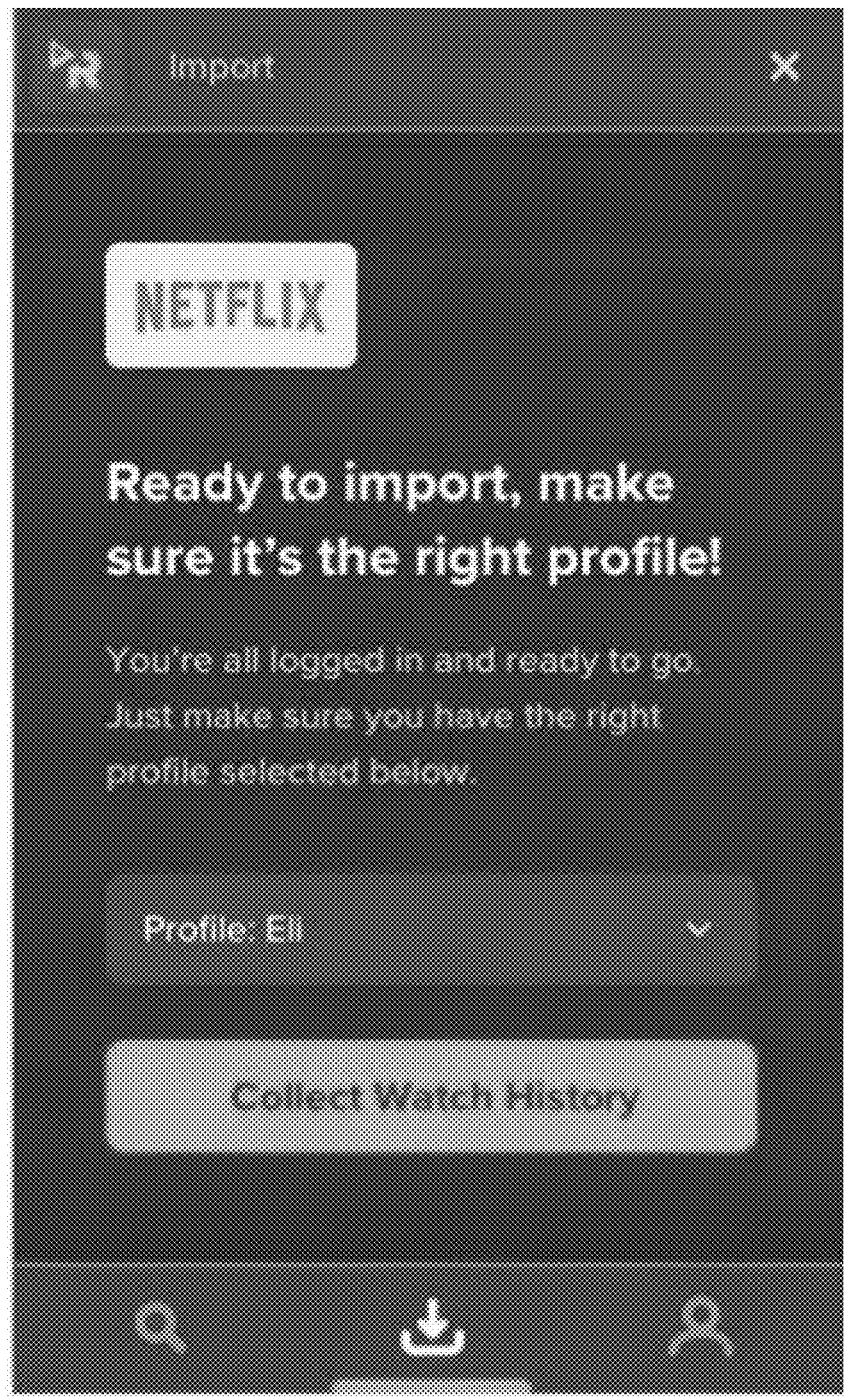
FIG. 5A is a diagram illustrating one example embodiment of a user interface for configuring importing of watch lists from streaming services to an aggregate streaming platform, in accordance with some embodiments.

FIG. 5A is a diagram illustrating one example embodiment of a user interface for configuring importing of watch lists from streaming services to an aggregate streaming platform, in accordance with some embodiments.

Within the user interface, a user has opted to allow the system to initiate the process to import their watch history and/or watch list. The user may select their user profile from a dropdown menu with a selection of user profiles tied to the user account or client device. The user may then select a "collect watch history" UI element to proceed with the importing.

Figure 5B:
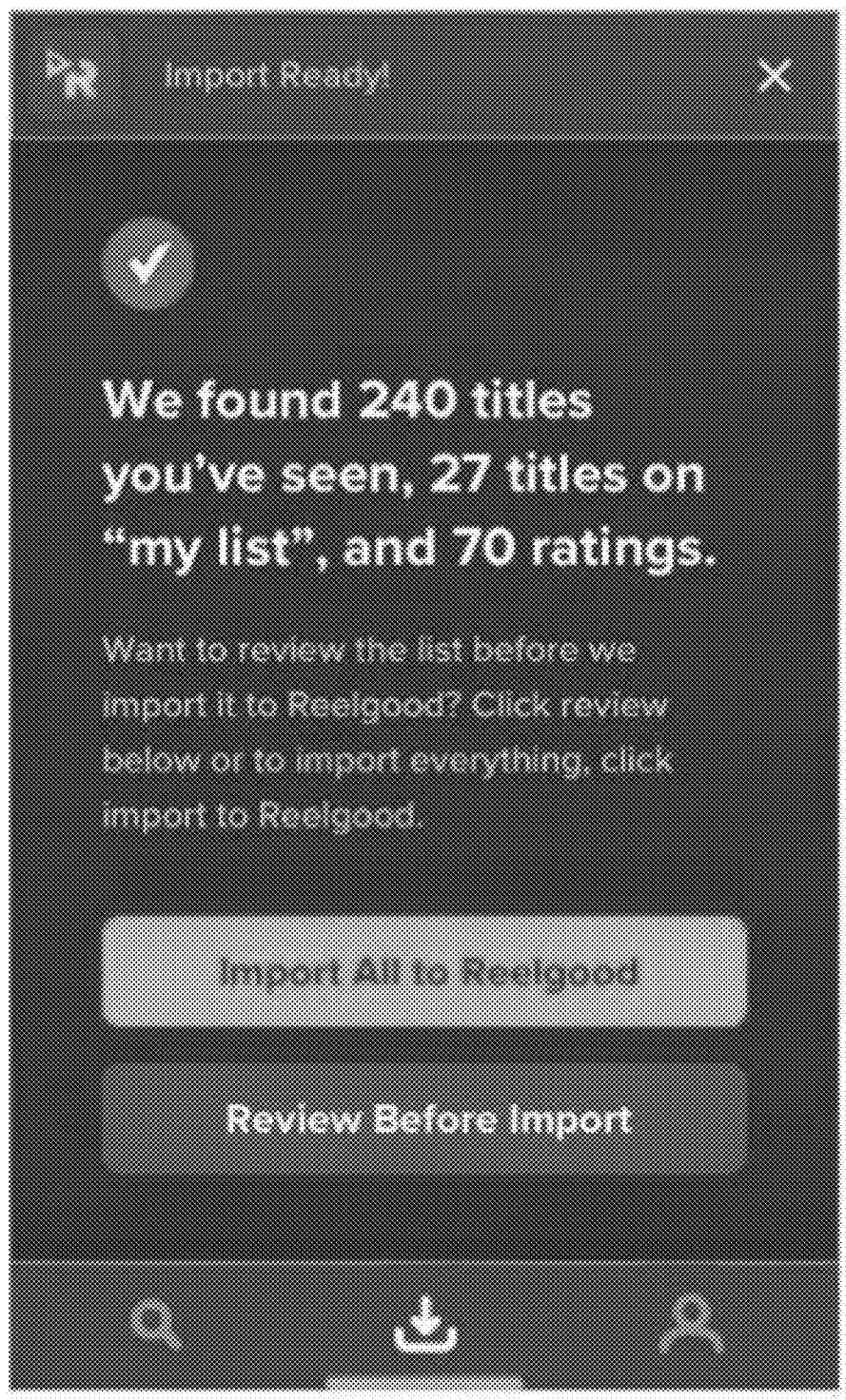
FIG. 5B is a diagram illustrating one example embodiment of a user interface for configuring importing of watch lists from streaming services to an aggregate streaming platform, in accordance with some embodiments.

FIG. 5B is a diagram illustrating one example embodiment of a user interface for configuring importing of watch lists from streaming services to an aggregate streaming platform, in accordance with some embodiments. Within the user interface, the system informs the user about the results of the importing of the watch history and/or watch list. The user is informed that the system has located "240 titles you've seen, 27 titles on 'my list', and 70 ratings". Thus, the system has extracted watch list data successfully, including metadata on one or more pieces of media regarding a rating the user has provided for those pieces of media; a list consisting of a wish list or list of favorite media content; and a number of titles the user has finished watching. The user may then opt to import this data into the aggregate streaming platform, or review the data in more detail before importing.

Figure 5C:
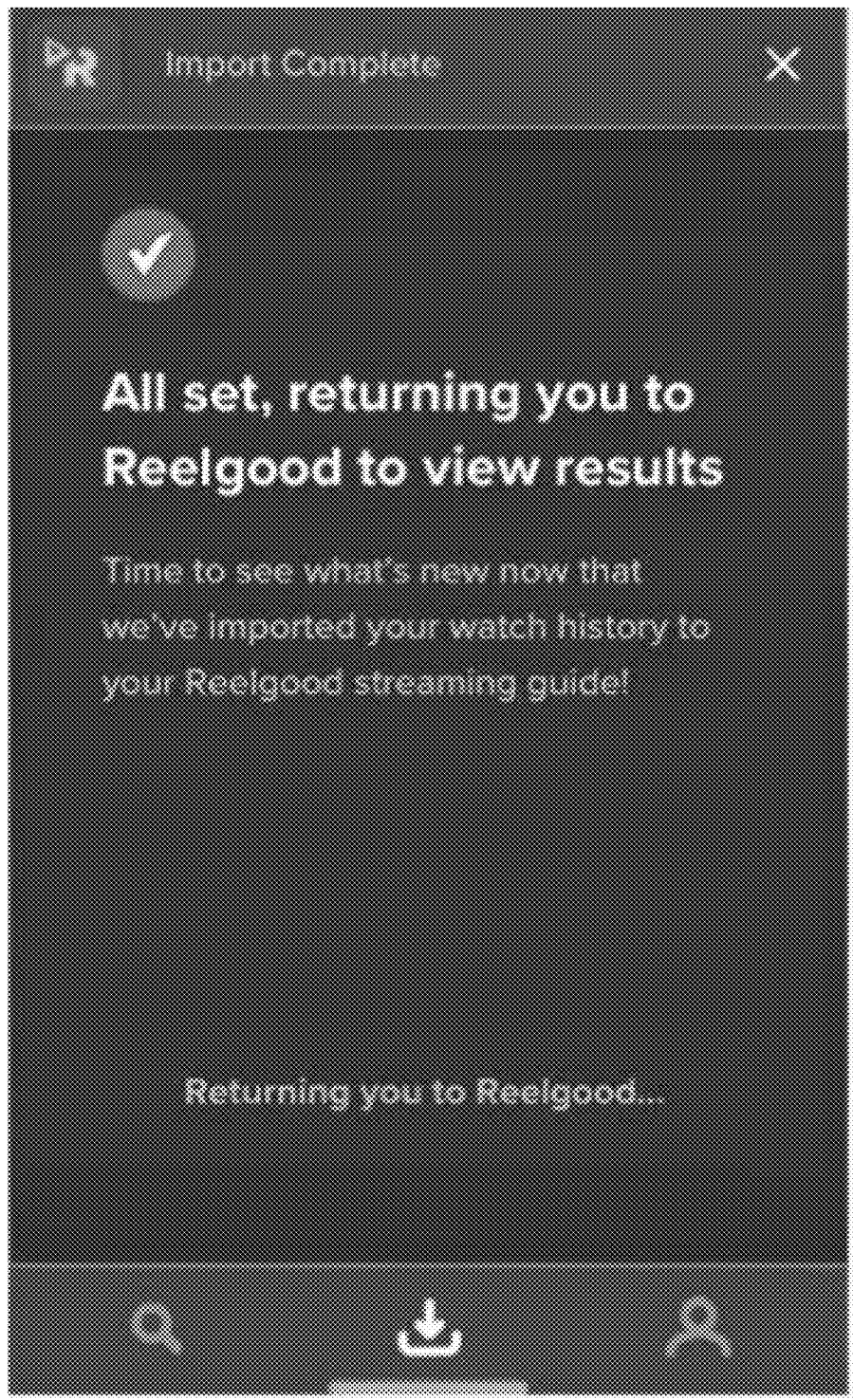
FIG. 5C is a diagram illustrating one example embodiment of a user interface for configuring importing of watch lists from streaming services to an aggregate streaming platform, in accordance with some embodiments.

FIG. 5C is a diagram illustrating one example embodiment of a user interface for configuring importing of watch lists from streaming services to an aggregate streaming platform, in accordance with some embodiments. Within the UI, the user is notified that the importing of the watch list has completed, and that the user will be returned to a dashboard or similar page to view the results of the importing.

Figure 5D:
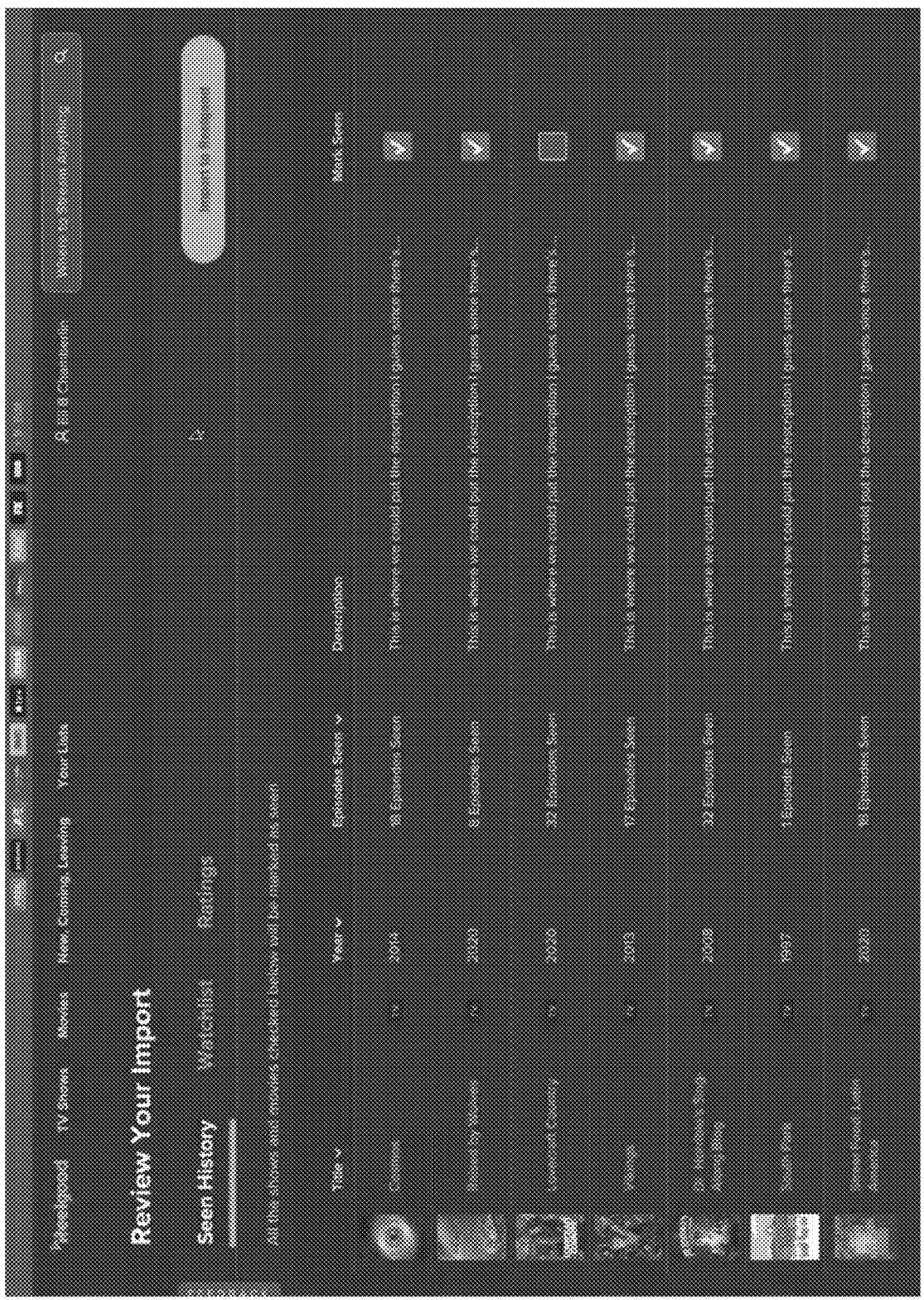
FIG. 5D is a diagram illustrating one example embodiment of a user interface for reviewing an imported watch list from streaming service within an aggregate streaming platform, in accordance with some embodiments.

FIG. 5D is a diagram illustrating one example embodiment of a user interface for reviewing an imported watch list from streaming service within an aggregate streaming platform, in accordance with some embodiments.

Within the UI, the user is provided with a review of the data that has been imported during the importing process from FIGS. 5A-5C. A "Seen History" is shown consisting of pieces of media from the streaming service which the user has either completed in their entirety, or, in the case of a television serial with multiple episodes, have watched at least one episode of. A title, year, number of episodes seen, a description, and a checkbox for whether the user would like to mark the piece of content as "seen" or not are displayed. In addition to the "Seen History" list, a "Watchlist" may also be shown, consisting of one or more pieces of media which the user would like to watch or has marked for future watching. A "Ratings" list may also be shown, listing a number of pieces of media which the user has provided a rating for, e.g., a rating, score, thumbs up or thumbs down, "like" rating, or any other suitable rating within a streaming platform.

Figure 6:
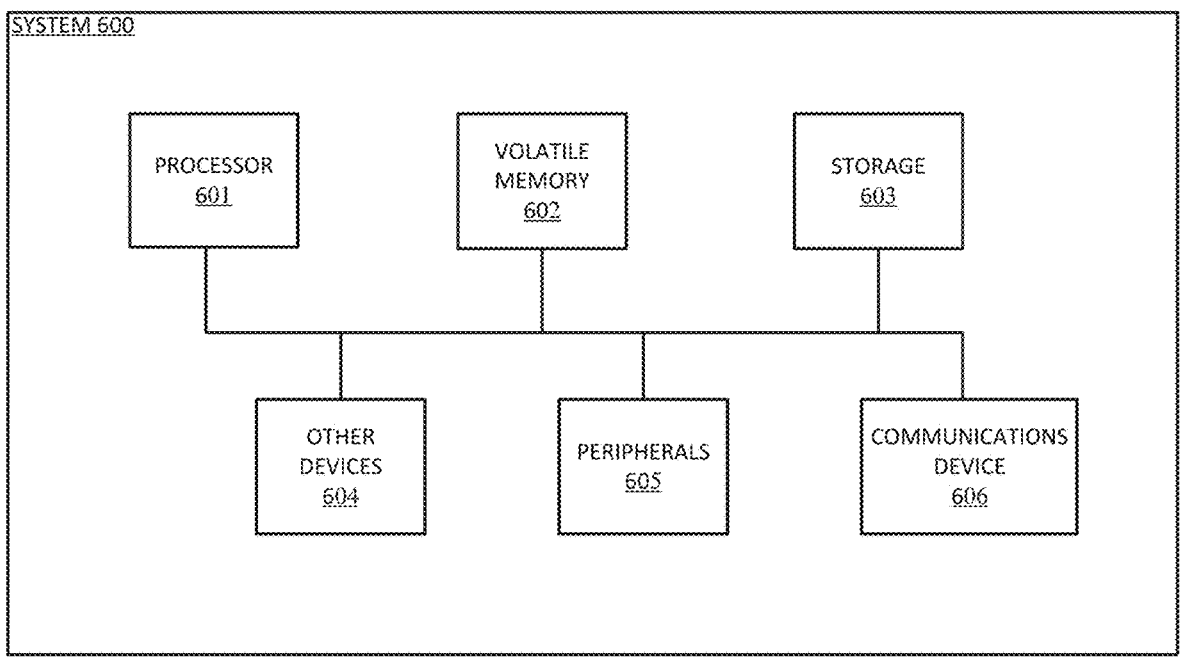
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players.

Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
 determining, by an aggregate streaming platform, multiple separate streaming services that are associated with the user, wherein each of the separate streaming services provide media content wherein the aggregate streaming platform retrieves watch history from both a first steaming service and a second streaming service;
 for the first streaming service of the determined multiple separate streaming services associated with the user, performing by the aggregate streaming platform, the operations of:
  displaying, via a user interface, the user interface comprising portion having a user profile selection menu and a portion having an input control to collect watch history for the first streaming service and a second streaming service, wherein the user interface comprises a portion indicating a name of the respective streaming service;
  receiving, via the user interface, a selection for a user profile associated with the first streaming service;
  receiving, via the user interface, a selection of the input control to collect watch history from the first streaming service;
  in response to the input to collect the watch history and based on the selected user profile, receiving a list of content items associated with the user for the first streaming service from a watch history page for the first streaming service, wherein the watch history page includes data for the content items which the user has viewed;
  after receiving the list of content items, displaying another user interface depicting a number of the content items that have been seen, wherein the another user interface comprises a user interface control to import all of the content items and comprises a user interface control to review the content items before an import;
  receiving an input to import a plurality of the content items;
  in response to the received input to import a plurality of the content items, extracting the data from the watch history page and importing the plurality of the content items and creating a watch list in a watch list repository of the aggregate streaming platform;
  based on the watch list, determining a playback bookmark for each of a subset of media provided via the streaming service, the subset of media representing the media which the user has curated or initiated playback;
  matching the playback bookmarks for the subset of media to analogous media within the aggregate streaming platform;
  assigning the playback bookmarks for the analogous media to a user profile associated with the user of the aggregate streaming platform, such that a user may initiate playback of analogous media within the first streaming service starting from the playback bookmark for that analogous media; and
  updating a content queue of the aggregate streaming platform for the user based on the analogous media with assigned playback bookmarks;
  initiating, via an assigned playback bookmark, a piece of media, wherein the playback is from the first streaming service; and
  wherein the content queue includes content for the multiple separate streaming services associated with the user.

2. The method of claim 1, wherein the content queue comprises one or more suggested or recommended pieces of media not currently present in the watch list or analogous media.

3. The method of claim 1, wherein the content queue comprises one of more pieces of media provided via the first streaming service that, for each respective piece of media, is associated with user activity representing that the user has at least one of: (i) not yet started playback of the respective piece of media, (ii) not yet completed entire playback of the respective piece of media, (iii) completed entire playback of the respective piece of media content that is associated with a subsequent piece of recommended media content not yet accessed by the user.

4. The method of claim 1, further comprising:
 in response to an input of the user interface control to review the content items, displaying a review user interface wherein the review user interface displays a user interface portion that displays the content items with a title and description of each respective content item, wherein the review interface comprises a user interface control to mark a respective content item as seen, and wherein the review user interface comprises an import control;
 wherein the content items displayed in the review user interface are content items from the first streaming service which have either been completed in their entirety, and, in the case of a television serial with multiple episodes, at least one episode of the television serial has been watched.

5. The method of claim 4,
 wherein the another user interface depicts a number of titles on a watch list and a number of ratings;
 wherein the multiple service providers comprise any one of a Netflix service provider, Amazon service provider, a Hulu service provider, an HBO service provider; and a Disney service provider.

6. The method of claim 5, further comprising:
 receiving metadata for the watch list, the metadata comprising data for a rating, and a starting and/or a stopping position for one or more pieces of media from the set of media;
 wherein the watch list comprises a set of media within the first streaming service the user has interacted with.

7. The method of claim 6, wherein the metadata for the watch list comprises at least one of: a unique identifier (ID) for each piece of media from the set of media and at least one metadata value for a predefined metadata keyword field, wherein the ID comprises a linked address for each piece of media for the first streaming service.

8. The method of claim 5, wherein each of the playback bookmarks comprises a playback position with a timestamp, the timestamp representing at least one of:
 (i) where in the media the user has stopped playback and
 (ii) a position amongst a group of serially ordered pieces of media.

9. The method of claim 1, wherein each of the streaming services associated with the user are associated with one or more permissions from the user to import data from the streaming service to the aggregate streaming platform.

10. The method of claim 1, wherein receiving the watch list of the user for a streaming service comprises extracting the watch list from a streaming service data site associated with the user to the aggregate streaming platform.

11. The method of claim 1, wherein receiving the watch list of the user for a streaming service comprises requesting and retrieving the watch list from the streaming service via one or more Application Programming Interface (API) calls.

12. The method of claim 1, wherein matching the playback bookmarks for the subset of media to the analogous media is performed based on identifiers for the subset of media, wherein a respective identifier may be based on at least one of: a unique identifier assigned to the subset of media, a portion of metadata describing the subset of media and textual data that corresponds with the subset of media.

13. The method of claim 1, comprising:
receiving a request from a user to continue watching a piece of media from the subset of media; and
presenting a viewing experience of that piece of media to the user, wherein playback of the piece of media is initiated from the playback bookmark.

14. The method of claim 1, wherein playback bookmarks are matched for a piece of media across a plurality of different streaming services.

15. The method of claim 14, wherein the most recent viewing of the user is used to determine the playback bookmark for a piece of media with watch list across multiple streaming services.

16. The method of claim 1, further comprising:
receiving an input to review the listing of the content items; and
in response to the input to review the listing of the content items, displaying a user interface listing each of the content items that the user has previously watched a portion of the content item; and
receiving a selection to mark a particular content item as having been seen.

17. The method of claim 1, further comprising:
for the second streaming service of the determined multiple separate streaming services associated with the user, performing by the aggregate streaming platform, the operations of:
displaying, via a user interface, the user interface comprising portion having a user profile selection menu and a portion having an input control to collect watch history for the first streaming service and the second streaming service;
receiving, via the user interface, a selection for a user profile of the second streaming service;
receiving, via the user interface, a selection of the input control to collect watch history from the second streaming service;
in response to the input to collect the watch history from the second streaming service and based on the selected user profile of the second streaming service, receiving a list of content items associated with the user for the second streaming service from a watch history page for the second streaming service, wherein the watch history page includes data for the content items which the user has viewed from the second streaming service;
after receiving the list of content items from the second streaming service, displaying another user interface depicting a number of the content items that have been seen via the second streaming service, wherein the another user interface comprises a user interface control to import all of the content items and comprises a user interface control to review the content items before an import;
receiving an input to import a plurality of the content items from the second streaming service;
in response to the received input to import a plurality of the content items from the second streaming service, extracting the data from the watch history page and importing the plurality of the content items from the second streaming service and creating a watch list in a watch list repository of the aggregate streaming platform;
based on the watch list, determining a playback bookmark for each of a subset of media provided via the second streaming service, the subset of media representing the media which the user has curated or initiated playback;
matching the playback bookmarks for the subset of media to analogous media within the aggregate streaming platform;
assigning the playback bookmarks for the analogous media to the user profile associated with the user of the aggregate streaming platform, such that the user may initiate playback of analogous media within the second streaming service starting from the playback bookmark for that analogous media; and
updating a content queue of the aggregate streaming platform for the user based on the analogous media with assigned playback bookmarks; and
initiating, via an assigned playback bookmark, a piece of media, wherein the playback is from the second streaming service.

18. A non-transitory computer-readable medium containing instructions, the method comprising instructions for:
determining, by an aggregate streaming platform, multiple separate streaming services that are associated with the user, wherein each of the separate streaming services provide media content wherein the aggregate streaming platform retrieves watch history from both a first steaming service and a second streaming service;
for the first streaming service of the determined multiple separate streaming services associated with the user, performing by the aggregate streaming platform, the operations of:
displaying, via a user interface, the user interface comprising portion having a user profile selection menu and a portion having an input control to collect watch history for the first streaming service and a second streaming service, wherein the user interface comprises a portion indicating a name of the respective streaming service;
receiving, via the user interface, a selection for a user profile associated with the first streaming service;
receiving, via the user interface, a selection of the input control to collect watch history from the first streaming service;
in response to the input to collect the watch history and based on the selected user profile, receiving a list of content items associated with the user for the first streaming service from a watch history page for the first streaming service, wherein the watch history page includes data for the content items which the user has viewed;
after receiving the list of content items, displaying another user interface depicting a number of the content items that have been seen, wherein the another user interface comprises a user interface control to import all of the content items and comprises a user interface control to review the content items before an import;
receiving an input to import a plurality of the content items;

in response to the received input to import a plurality of the content items, extracting the data from the watch history page and importing the plurality of the content items and creating a watch list in a watch list repository of the aggregate streaming platform;

based on the watch list, determining a playback bookmark for each of a subset of media provided via the streaming service, the subset of media representing the media which the user has curated or initiated playback;

matching the playback bookmarks for the subset of media to analogous media within the aggregate streaming platform;

assigning the playback bookmarks for the analogous media to a user profile associated with the user of the aggregate streaming platform, such that a user may initiate playback of analogous media within the first streaming service starting from the playback bookmark for that analogous media; and updating a content queue of the aggregate streaming platform for the user based on the analogous media with assigned playback bookmarks;

initiating, via an assigned playback bookmark, a piece of media, wherein the playback is from a first streaming service; and wherein the content queue includes content for the multiple separate streaming services associated with the user.

19. The non-transitory computer-readable medium of claim 18, further comprising:

in response to an input of the user interface control to review the content items, displaying a review user interface wherein the review user interface displays a user interface portion that displays the content items with a title and description of each respective content item, wherein the review interface comprises a user interface control to mark a respective content item as seen, and wherein the review user interface comprises an import control;

wherein the content items displayed in the review user interface are content items from the streaming service which have either been completed in their entirety, and, in the case of a television serial with multiple episodes, at least one episode of the television serial has been watched.

20. The non-transitory computer-readable medium of claim 18, further comprising:

receiving metadata for the watch list, the metadata comprising data with respect to at least one of the user watching, rating, starting, or stopping one or more pieces of media from the set of media.

\* \* \* \* \*